L. B. FULTON.
FLUID PRESSURE REGULATOR.
APPLICATION FILED DEC. 11, 1907.
900,275.
Patented Oct. 6, 1908.
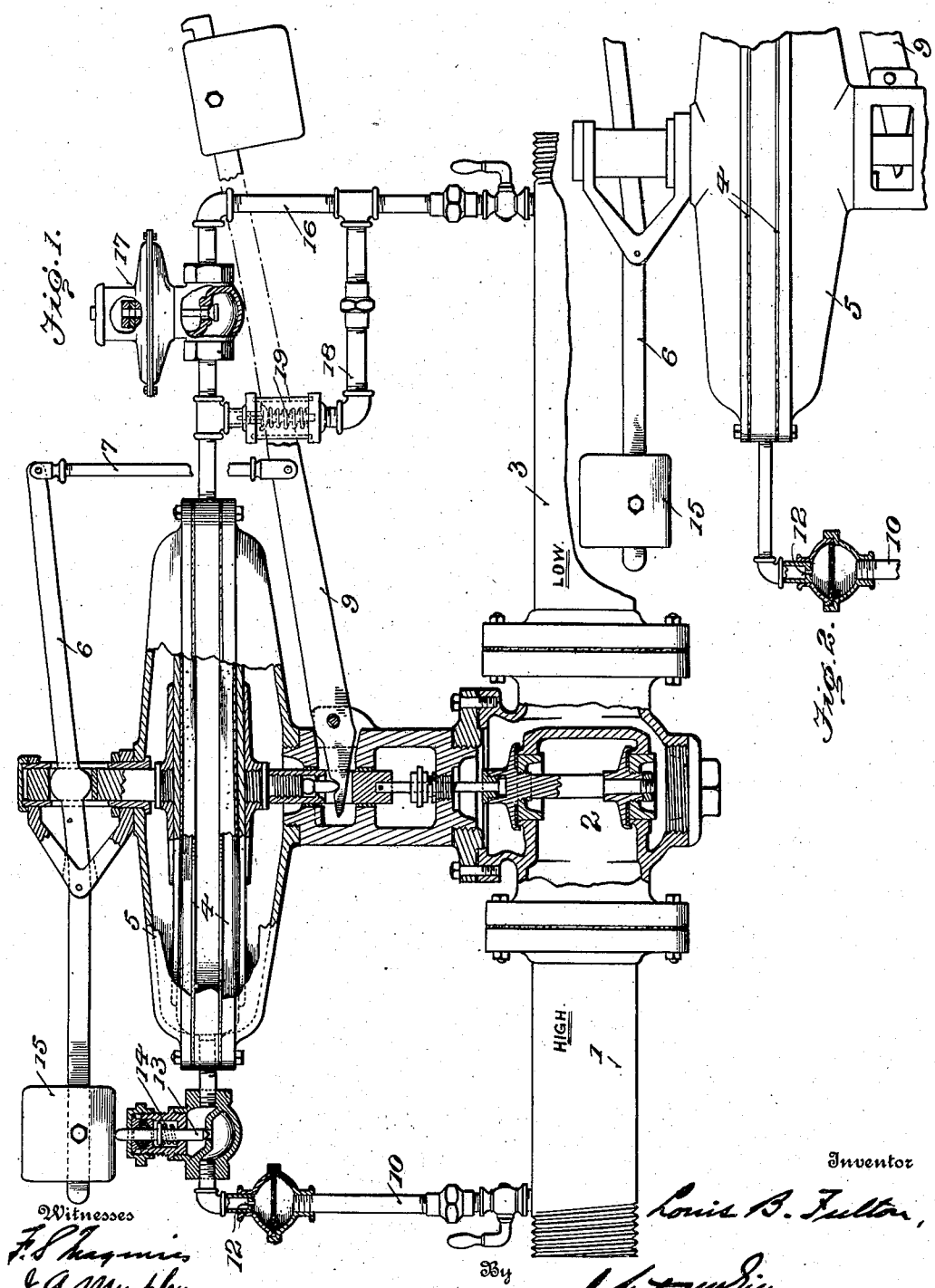

UNITED STATES PATENT OFFICE.

LOUIS B. FULTON, OF PITTSBURG, PENNSYLVANIA, ASSIGNOR TO THE CHAPLIN-FULTON MANUFACTURING COMPANY, OF PITTSBURG, PENNSYLVANIA, A CORPORATION OF PENNSYLVANIA.

FLUID-PRESSURE REGULATOR.

No. 900,275.    Specification of Letters Patent.    Patented Oct. 6, 1908.

Application filed December 11, 1907. Serial No. 406,060.

*To all whom it may concern:*

Be it known that I, LOUIS B. FULTON, of Pittsburg, in the county of Allegheny and State of Pennsylvania, have invented certain new and useful Improvements in Fluid-Pressure Regulators; and I do hereby declare the following to be a full, clear, and exact description of the invention, such as will enable others skilled in the art to which it appertains to make and use the same.

The primary object of this invention is to provide means for controlling a fluid-pressure regulator from the high-pressure side thereof without the use of an auxiliary high-pressure regulator, thereby lessening the cost and simplifying the construction, while at the same time insuring the quick seating, or partial seating, and opening of the regulating valve to maintain a practically uniform pressure in the service mains on the low-pressure side of the regulator.

The invention will be hereinafter fully set forth and particularly pointed out in the claims.

In the accompanying drawings, Figure 1 is a side elevation, partly in section. Fig. 2 is a similar view, showing a slight modification.

Referring to the drawings, 1 designates the high-pressure main; 2 the casing of the regulating valve, and 3 the low-pressure or service main leading from the outlet side of the valve casing. The regulating valve, as a whole, corresponds to that shown and described in Letters Patent No. 845,708, issued to me February 26, 1907. The valve regulating means embodies two oppositely movable diaphragms 4 located within the superposed casing 5, the movement of the upper diaphragm being communicated through a weighted lever 6 and link 7 to a weighted lever 9 which engages the valve stem. The valve regulating means may, however, be differently constructed.

The high-pressure main 1 is connected with the diaphragm casing 5 by a pipe 10 which, in the present instance, opens into the space between the two diaphragms. Within this pipe 10 is a stricture 12 forming a reduced opening so as to transmit pressure to the diaphragm casing through the medium of a lessened but variable volume of gas, or other fluid, from the high pressure side of the regulator. Also within this pipe 10, between the stricture and the diaphragm casing, I preferably locate a cut-off valve 13, which is normally held unseated by a spring 14. When the pressure in casing 5 effects the seating, or partial seating, of the regulator valve, the movement of lever 6 will cause the complete closing of valve 13. For this purpose the weight 15 is positioned to engage with the protruding end of the valve. It is not necessary, however, that this cut-off valve be employed under all circumstances. I have shown it omitted in Fig. 2.

16 designates a second pipe connecting the low-pressure main 3 with the diaphragm casing, and within this pipe 16 is located an auxiliary low-pressure regulator 17 which is automatically seated upon an increase of pressure in the service or low-pressure mains. When this occurs the normally constant pressure in the diaphragm casing increases to an extent sufficient to cause the quick complete or partial seating of the regulator valve which remains in the position to which it is moved until the pressure in the service mains falls, whereupon the auxiliary low-pressure regulator opens and allows the normal constant pressure to be restored in the diaphragm casing, the regulator valve being opened by the weighted lever 9.

To obviate injury from any excess pressure in the diaphragm casing, I provide a relief-valve 19, which, when unseated by excess of fluid-pressure, allows such fluid to pass through a pipe 18 to the low pressure side. This valve is shown as located between the auxiliary low-pressure regulator and the diaphragm casing, and the pipe 18 as opening into pipe 16. When the cut-off valve 13 is employed, this relief valve is of advantage only in the event of leakage around such cut-off valve, since otherwise the latter prevents the building up of pressure in the diaphragm casing in excess of what is required for the seating of the regulator valve.

The advantages of my present improvements will be apparent to those skilled in the art. It will be observed that a reduced and variable volume of fluid under pressure from the high-pressure side of the regulator is constantly supplied to the diaphragm casing, and the quick seating, or partial seating, and opening of the regulator valve is effected without the use of an auxiliary high-pressure regulator. The seating of the cut-off valve, in actual practice, very seldom occurs, since the parts are adjusted to insure a practically uniform pressure in the service mains without the necessity of completely cutting off the passage of the high-pressure into the diaphragm casing. The use of this valve, however, is of advantage as an additional safe-guard against undue pressure in the diaphragm casing in the event of the demands on the service mains being entirely discontinued or lessened to a degree greater than ordinarily occurs. In either event, the seating of valve 13 cuts off all flow until the normal pressure in the service mains is restored.

I claim as my invention:

1. A fluid-pressure regulator comprising a controlling valve, a diaphragm, a casing for the latter, a pipe leading from the high-pressure side of said valve to said casing for supplying a lessened and variable volume of fluid under pressure to said casing, a second pipe connecting said casing with the low-pressure side of the valve, an auxiliary low-pressure regulator within such latter pipe, a valve for relieving excess fluid pressure on the diaphragm, and means for conveying the excess fluid to the low-pressure side of the controlling valve.

2. A fluid-pressure regulator comprising a controlling valve, a diaphragm, a casing for the latter, a pipe leading from the high-pressure side of said valve to said casing, a stricture in said pipe, a lessened and variable volume of fluid under pressure being supplied through said pipe to said casing, a second pipe connecting said casing with the low-pressure side of the valve, an auxiliary low-pressure regulator within such latter pipe, a valve for relieving excess fluid pressure on the diaphragm, and means for conveying the excess fluid to the low-pressure side of the controlling valve.

3. A fluid-pressure regulator comprising a valve, a diaphragm, a casing for the latter, a pipe leading from the high-pressure side of said valve to said casing, a cut-off valve in said pipe, a second pipe connecting said casing with the low-pressure side of the valve, an auxiliary low-pressure regulator within such auxiliary low-pressure regulator within such latter pipe, and means actuated by the pressure in the diaphragm casing for effecting the seating of said cut-off valve.

4. A fluid-pressure regulator comprising, in combination, a valve, a diaphragm connected to such valve, a second daiaphragm, said diaphragms being movable in opposite directions, a casing for such diaphragms, levers actuated by the movements of said diaphragms, a connection between said levers, one of said levers tending to unseat such valve, a pipe connecting the diaphragm casing at a point between the diaphragms with the high-pressure side of said valve and constructed to supply a lessened and variable volume of fluid under pressure, a second pipe connecting said casing with the low-pressure side of the valve, an auxiliary low-pressure regulator in said second pipe, and a valve-controlled by-pass connected to such second pipe on opposite sides of said auxiliary low-pressure regulator.

5. A fluid-pressure regulator comprising, in combination, a valve, a diaphragm connected to such valve, a second diaphragm, said diaphragms being movable in opposite directions, a casing for such diaphragms, levers actuated by the movements of said diaphragms, a connection between said levers, one of said levers tending to unseat such valve, a pipe connecting the diaphragm casing at a point between the diaphragms with the high-pressure side of said valve and constructed to supply a lessened and variable volume of fluid under pressure, a second pipe connecting said casing with the low-pressure side of the valve, an auxiliary low-pressure regulator in said second pipe, and a cut-off valve in the first mentioned pipe designed to be seated by one of said levers when the auxiliary low-pressure regulator is seated.

6. A fluid-pressure regulator comprising, in combination, a valve, a diaphragm connected to such valve, a second diaphragm, said diaphragms being movable in opposite directions, a casing for such diaphragms, levers actuated by the movements of said diaphragms, a connection between said levers, one of said levers tending to unseat such valve, a pipe connecting the diaphragm casing at a point between the diaphragms with the high-pressure side of said valve and constructed to supply a lessened and variable volume of fluid under pressure, a second pipe connecting said casing with the low-pressure side of the valve, an auxiliary low-pressure regulator in said second pipe, a cut-off valve in the first mentioned pipe designed to be seated by one of said levers when the auxiliary low-pressure regulator is seated, and a valve-controlled by-pass connected to such second pipe on opposite sides of said auxiliary low-pressure regulator.

In testimony whereof, I have signed this specification in the presence of two subscribing witnesses.

LOUIS B. FULTON.

Witnesses:
CHAS. W. TOWNSEND,
C. E. McCARGO.